Patented May 5, 1953

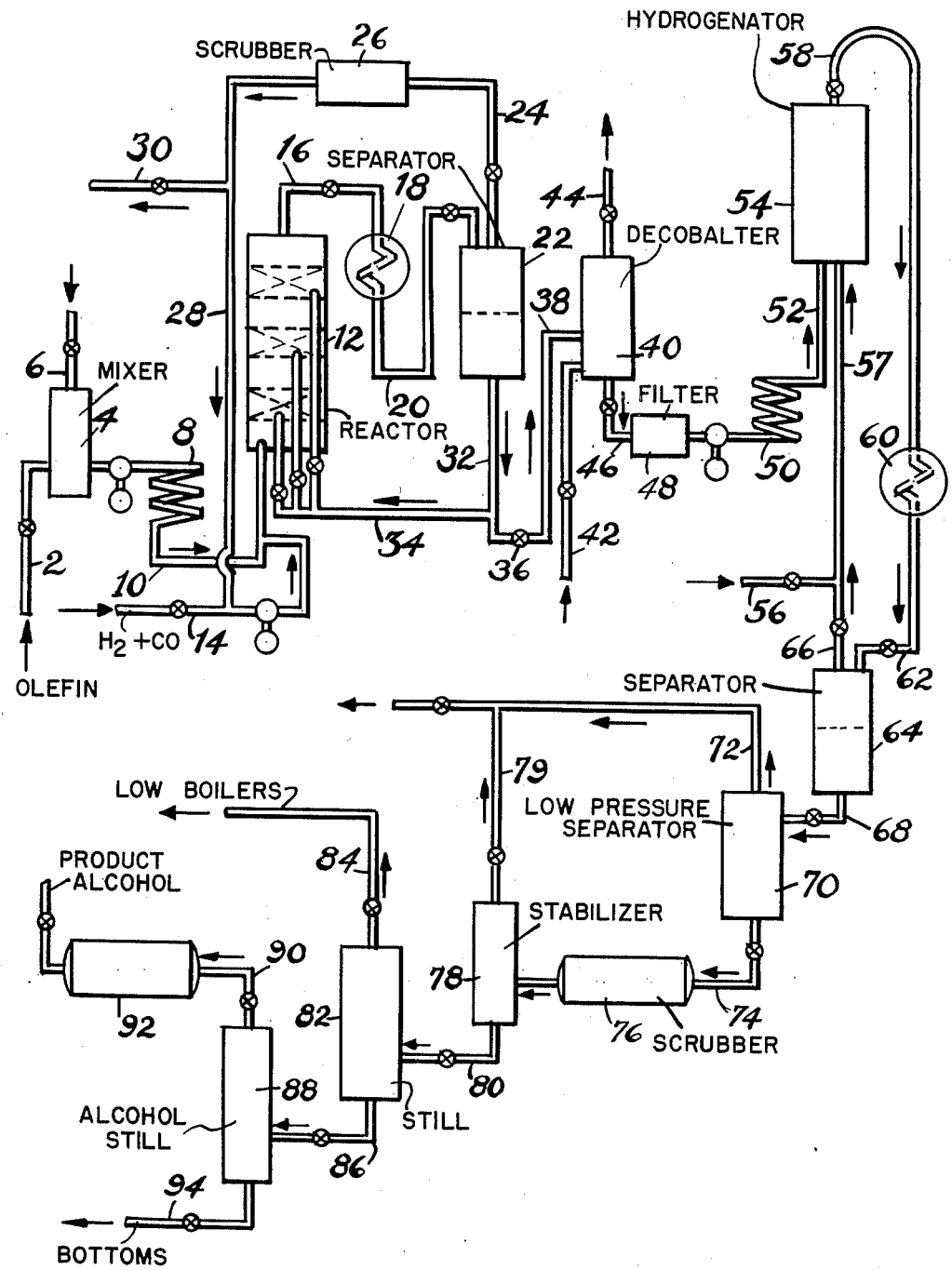

2,637,746

UNITED STATES PATENT OFFICE 2,637,746

SYNTHESIS OF OCTYL ALCOHOLS

Paul T. Parker, Baton Rouge, La., assignor to Standard Oil Development Company, a corporation of Delaware Application August 12, 1948, Serial No. 43,919

7 Claims. (Cl. 260—638)

The present invention relates to the preparation of oxygenated organic compounds by the reaction of carbon monoxide and hydrogen with olefinic hydrocarbons in the presence of a carbonylation catalyst. More specifically, the invention relates to an improved process for manufacturing primary alcohols, specifically octyl alcohols, by operations involving interaction of carbon monoxide, hydrogen, a hydrocarbon comprising heptenes, and a cobalt carbonylation catalyst to form octyl aldehydes, and subsequent reduction of these aldehydes to octyl alcohols.

Primary alcohols of this type are of great economic importance and interest because of their use as intermediates in the manufacture of plasticizers of the di-ester type. Hitherto these have been supplied mainly by such comparatively costly procedures as aldol condensation of butyraldehydes, followed by dehydration and hydrogenation of the unsaturated octyl aldehyde. It is a purpose of the present invention to disclose a novel and highly economically attractive process for manufacturing octyl alcohols from cheap and readily available hydrocarbon material.

In the conversion of heptenes to octyl alcohols by reaction with carbon monoxide and hydrogen in the presence of cobalt catalyst to form octyl aldehydes, followed by hydrogenation of the aldehydes to alcohols, it has been found that the highest olefin conversion levels are obtained in the first, or carbonylation stage of the reaction within a rather narrow range of temperature, when the other conditions of the reaction such as contact time, total pressure, hydrogen to carbon monoxide ratios and cobalt concentrations have been appropriately selected. For example, in a continuous process with a $C_7$ olefin feed at a nominal residence time of about 1 to 3 hours, a pressure of about 3000 p. s. i. g., an $H_2/CO$ ratio of about 1.1/1 fed to the unit in a volume corresponding to about 2500–3000 cubic feet per barrel of olefin, highest olefin conversion of about 70–80% to octyl aldehydes was obtained within the narrow temperature range of about 300–360° F. when about 0.1 to 0.3 weight percent cobalt (as metal) is dissolved in the olefinic feed as catalyst in the form of soluble cobalt salt of an organic acid, such as oleic or naphthenic. Within the aldehyde reactor, under the conditions of the reaction, the dissolved catalyst is decomposed and converted to cobalt carbonyls, which probably are the active carbonylation agents. The carbonyls are soluble in the liquid within the reactor and are removed from the reaction zone mainly dissolved in the effluent product. A smaller proportion of the cobalt carbonyl is also removed from the reaction zone by the exit gas stream.

It has now been found that the relative amount of cobalt removed from the reaction zone under a given set of reaction conditions, such as a total pressure of about 3000 p. s. i. g. and a carbon monoxide partial pressure of 1300–1800 p. s. i. g. is critically dependent upon the reaction temperature and is relatively unaffected by the initial cobalt concentration in the olefin feed. Thus if the temperature within the reaction zone is too high, a major part of the cobalt introduced into the zone as cobalt salt is decomposed into the metal and retained in the zone. On the other hand, if the temperature is too low, the amount of cobalt leaving the reaction zone has been found to be greater than that fed to the unit, the excess being at the expense of the cobalt previously retained in the reaction zone, which has been converted to the carbonyl under the lower temperatures and dissolved in the effluent.

It is a purpose of the present invention to disclose a process for obtaining high yields of aldehydes from the reaction of carbon monoxide and hydrogen with olefins in the presence of a carbonylation catalyst.

It is also a purpose of the present invention to provide a new and highly economically attractive method for manufacturing octyl alcohols from cheap and readily available hydrocarbon material.

Other purposes and advantages of the invention will become apparent hereinafter from the more detailed description that follows.

It has now been found that by operating under such critical conditions of temperature, initial cobalt concentration, and carbon monoxide partial pressures that a supply of metallic cobalt is maintained within the carbonylation zone at all times but that the amount of cobalt dissolved in the effluent streams is of the same order of magnitude as that present in the original feed, highest yields of octyl aldehydes may be obtained, accompanied by a reduction in the amount of fresh cobalt catalyst necessary to be supplied to the fresh feed. This active cobalt catalyst may be deposited in the reaction zone originally as a solid cobalt catalyst or may be deposited during the carbonylation reaction by adjustment of temperature, carbon monoxide partial pressure and concentration of cobalt salt introduced with the olefin feed.

Though it is known that olefinic compounds may be reacted with $H_2$ and $CO$ in the presence of cobalt to form aldehydes containing one more carbon atom than the olefin, such processes have hitherto employed, when carried out in commercial operation, solid catalyst in the form of slurries. Such slurry processes suffer from the disadvantages common to such type operations, as high initial investment in slurry pumps, erosion of equipment, and extensive filtering equipment, all not required in the process of this invention.

The present invention and its application will best be understood from the more detailed description hereinafter, wherein reference will be made to the accompanying drawing, which is a schematic representation of a system suitable for carrying out a preferred embodiment of the invention. Referring now to Figure I a liquid olefinic hydrocarbon product, such as a $C_7$ olefin, which is a nonselective polymer of propylene and butylenes, prepared in the presence of a calcined phosphoric acid-kieselguhr catalyst, and from which polymer the fraction boiling between 170 and 210° F., having a heptene content of about 90–100%, is cut and used as feed in the present invention. The olefin is passed through line 2 to mixer 4, wherein cobalt naphthenate is added through line 6 in such proportions that the weight of cobalt in solution is about .15–.3% of the total liquid. The mixture is then pumped to preheater 8 wherein it is brought to the desired temperature range of 475° to 525° F., and then discharged via line 10 to the bottom portion of primary reactor 12. Reactor 12 comprises a high pressure reactor vessel which may, if desired, be packed with non-catalytic material such as Raschig rings, porcelain or quartz chips, ceramic material, pumice, and the like. Reactor 12 may be divided into discrete packed zones separated by any suitable means, such as support grids, etc., or it may comprise but a single packed zone, or it may contain no packing.

A stream of synthesis gas comprising $H_2$ and CO in the approximate ratio of 0.5 to 2 volumes $H_2$ to one volume of CO, preferably 1.0–1.2 to 1, is fed into reactor 12 through lines 14 and 10. The synthesis gas stream is a composite of fresh gas and recycle, as detailed more fully below, and flows upward with the olefin feed through reactor 12. Reactor 12 is preferably operated at a pressure of about 3000–3500 p. s. i. g., and at a very carefully controlled temperature range of 300–360° F., preferably between 340–360° F. The rate of flow of synthesis gases and of olefin through reactor 12 is so regulated that the desired conversion level of olefin is obtained. These conditions are an olefin fresh feed rate of about 0.4 v./v./hour, fresh synthesis gas feed rate of 2000–3000 cu. ft./barrel of olefin, and a nominal residence time of olefin of about 2.5 hours.

The carbonylation reaction in reactor 12 is carried out substantially adiabatically, that is, no external cooling means such as tubes or coils is provided, but the cooling and temperature control is carried out by recycle of a portion of the product, as described below. Liquid oxygenated reaction products containing catalyst in solution, as well as unreacted synthesis gases are withdrawn from an upper portion of high pressure reactor 12 and are transferred through line 16 to cooler 18, wherein any conventional means of cooling may be employed and from thence via line 20 to high pressure separator 22 where unreacted gases are withdrawn overhead through line 24, scrubbed in scrubber 26 of entrained liquid, and are preferably recycled to reactor 12 via lines 28 and 14. A portion of the recycle may be purged through line 30 to maintain the desired $H_2$/CO ratio in the feed. The recycle gas rate is about 6000 cu. ft./barrel olefin feed.

Liquid carbonylation product containing dissolved therein relatively high concentrations of cobalt carbonyl is withdrawn from separator 22 through line 32. A portion of said stream is recycled to reactor 12 via line 34 to aid in the cooling and maintenance of temperature control of the primary carbonylation stage. Preferably recycle liquid product is injected at various levels within reactor 12 to obtain close temperature control throughout the whole reactor. Approximately 400–500 volume per cent of liquid reaction product on the fresh olefin feed may be recycled for this purpose. The temperature of such recycled material is generally dependent upon that of the atmosphere, and may be 30°–100° F.

The balance of the primary reaction product not recycled to reactor 12, which may comprise, beside desired octyl aldehydes, also unreacted olefins, secondary reaction products, and dissolved cobalt carbonyl is withdrawn through pressure release valve 36 and line 38 and passed to decobalting zone 40. Within decobalter 40, soluble cobalt carbonyl is removed from the aldehyde product prior to high pressure hydrogenation; in order to prevent its decomposition in the subsequent hydrogenation stage with consequent reactor plugging and catalyst fouling with metallic cobalt. Carbonyl decomposition is obtained by heating the aldehyde product by such means as closed steam coils to 300–350° F., at a pressure just high enough to keep the components in the liquid phase. Pressures in the neighborhood of 100–150 p. s. i. g. are preferable. The product containing catalyst in solution is injected into decobalter 40 through line 38 at a feed rate of about 2–4 v./v./hour. If necessary, stripping gas, such as hydrogen may be added through line 42 at the rate of 0–300 cubic feet/barrel to aid in decreasing the carbon monoxide partial pressure. If desired, it may be advantageous to operate with two or more decobalters, switching the stream from one to the other as the one in service accumulates excessive quantities of cobalt metal. The gas stream comprising stripping gas and carbon monoxide may be removed overhead from 40 through line 44 and used as desired.

The liquid aldehyde product now substantially free of dissolved carbonylation catalyst is withdrawn from catalyst removal zone 40 through line 46 and passed to filter 48 for removal of any suspended cobalt. The filtered solution is withdrawn from filter 48, passed through preheater 50 to the bottom portion of hydrogenation reactor 54 via line 52. Simultaneously hydrogen is supplied to reactor 54 through lines 56 and 57 in proportions sufficient to convert the aldehydes into octyl alcohols. Hydrogenator 54 may contain a mass of any conventional hydrogenation catalyst, such as nickel, copper chromite, sulfactive hydrogenation catalyst as tungsten sulfide, nickel sulfide, molybdenum sulfide, preferably supported in carriers, such as pumice, charcoal, diatomaceous earth, etc. Reactor 54 is preferably operated at temperatures of about 400–500° F., pressure of about 2800–3200 p. s. i. g., a liquid feed rate of about 0.6 v./v./hour and a recycle gas rate of about 15,000 cu. ft./barrel.

The products from the hydrogenation reactor and unreacted hydrogen may be withdrawn overhead through line 58 from reactor 54 then passed through cooler 60 and line 62 into high pressure separator 64. Unreacted hydrogen may be withdrawn overhead through line 66 and recycled to hydrogenator 54 wherein it aids in cooling and temperature control. The liquid products are withdrawn from separator 64 through line 68 into low pressure separator 70 where more dissolved gas is flashed overhead through line 72 and liquid products are withdrawn through line 74 and passed through caustic scrubber 76 stabilizer 78 and line 80 where gases are withdrawn overhead through 79, thence to hydrocarbon still 82, wherein are distilled overhead low boiling products, mostly hydrocarbons boiling below 340° F. These materials are removed as a heads cut through line 84 and may be used as gasoline blending agent. The bottoms from this primary distillate are withdrawn from hydrocarbon still 82 through line 86 and sent to alcohol still 88 where an octyl alcohol cut, boiling within the range of 350° to 375° F. at atmospheric pressures is taken. The alcohols are withdrawn overhead from still 88 through line 90 and sent to storage tank 92. The high boiling bottoms from this distillation, comprising secondary reactor products, are removed from still 88 via line 94 and may be used in any desired manner as cracking stock, fuel, etc., or they may be further processed and distilled at subatmospheric pressure to recover valuable oxygenated organic products.

The invention admits of numerous modifications apparent to those skilled in the art. Thus mention has not been made of various accessory equipment which normally are used in a commercial plant. Thus in the interest of good heat economy, various heat exchangers and economizers would be employed to utilize whatever heat is available in the most effective and efficient manner and, in order to control the process, pumps, compressors, valves, flow meters, etc., would be included in the equipment.

As a result of the adjustment of the reaction variables in the manner enumerated above, as a result of which the cobalt naphthenate catalyst within the reactor 12 is decomposed to a mixture of suspended metallic cobalt and oil-soluble cobalt carbonyl is formed, and under these conditions high yields of aldehyde product are obtained. It has been found that though, for a given catalyst concentration in the feed, the yield of reaction product increases with the temperature, this relation holds only for the limited range defined in the condition of the invention. Above these limits, increased temperature decreases the yield of aldehyde product, because the limits of the invention, wherein solid cobalt and cobalt carbonyl exist simultaneously in the reactor zone and the cobalt entering the zone as cobalt naphthenate and that leaving said reaction zone as cobalt carbonyl dissolved in the reaction product are not met.

The following table indicates the criticality of the effect of temperature upon the operation, when a $C_7$ polymer is converted to octyl aldehydes. The feed rate is 0.6 v./v./hr., and the catalyst dissolved in the entering feed is 1.3 wt. percent cobalt naphthenate.

| Temperature, °F. | Percent Cobalt in Aldehyde Product Effluent | Percent Olefin Conversion |
| --- | --- | --- |
| 320 | 0.17 | 57 |
| 330 | 0.12 | 61 |
| 340 | 0.09 | 65 |
| 350 | 0.07 | 69 |
| 360 | 0.06 | 69 |
| 370 | 0.04 | 52 |

The following pilot plant runs are indicative of the high yields of aldehydes and high alcohol selectivities obtainable when operating in accordance with the present invention. Feed stock was a $C_7$ polymer boiling between 170–210° F. and which gave, on an ASTM distillation 5% over at 185° F. and 90% at 200° F.

| | | |
| --- | --- | --- |
| Carbonylation Stage: | | |
| Catalyst, wt. percent Cobalt naphthenate | 3 | 2.5 |
| Temperature, °F | 348 | 349 |
| Pressure, p. s. i. g | 3,000 | 3,000 |
| Fresh Feed, V./V./Hour | 0.4 | 0.4 |
| Recycle Product, Vol. percent on F. F. | 500 | 500 |
| Recycle Gas Rate, C. F./B. F. F. | 6,200 | 6,100 |
| $H_2$/CO Ratio: | | |
| Fresh Synthesis Gas | 1.2:1 | 1.1:1 |
| Fresh+Recycle Gas to Reactor | 0.9:1 | 1.1:1 |
| Synthesis Gas Consumption, C. F./B.F.F. | 1,930 | 2,400 |
| Olefin Conversion, percent | 81 | 81 |
| Decobalting Stage, Pancake Type Steam Coil Heater: | | |
| Pressure, p. s. i. g | 95 | 95 |
| Temperature, °F | 308 | 308 |
| Feed Rate, V./V./Hour | 0.35 | 0.35 |
| Stripping gas Rate, C. F./B | 100 | 150 |
| Soluble Cobalt, wt. percent: | | |
| Before Decobalter | 0.041 | 0.081 |
| After Decobalter | 0.001 | 0.001 |
| Hydrogenation Stage: | | |
| Temperature, °F | 394 | 393 |
| Pressure, p. s. i. g | 2,900 | 2,900 |
| Feed rate, V./V./Hour | 0.7 | 0.6 |
| Gas Rate, C. F./B | 5,000 | 5,000 |
| Product Carbonyl Number | 18 | 11 |
| Product Yields, wt. percent Output on Polymer: | | |
| Octyl alcohols | 71.5 | 74.6 |
| Bottoms | 28.7 | 26.8 |

These data show that when a reservoir of both active and potentially active cobalt is maintained in the carbonylation zone in the aldehyde synthesis reaction high olefin conversions are obtained.

The foregoing description and examples though illustrating specific applications and results of the invention, are not intended to exclude modifications obvious to those skilled in the art, and which are within the scope of the invention.

What is claimed is:

1. The continuous liquid phase process of producing octyl alcohols which comprises continuously feeding a hydrocarbon solution comprising substantially heptenes and a minor proportion of soluble cobalt salt of an organic acid into a single stage carbonylation reaction zone, feeding into said reaction zone a synthesis gas containing a fresh $H_2$ to CO ratio in the range of about 1.0–1.2 to 1, maintaining conditions of temperature in the range of about 300 to 360° F. and pressure in the range of about 2900 to 3400 p. s. i. g. within said reaction zone such that a major portion of said added cobalt salt is converted to cobalt carbonyl and a minor portion to cobalt metal within said reaction zone, maintaining metallic cobalt present at all times within said zone maintaining an olefin feed rate to said zone in the range of from about 0.4 to 0.6 v./v./hr., allowing said heptenes, carbon monoxide, hydrogen and cobalt carbonyl to remain resident within said reaction zone at said temperature for a time sufficient to convert substantial quantities of said heptenes to octyl aldehydes, withdrawing a solution comprising reaction products and dissolved cobalt carbonyl from said reaction zone, the weight percent cobalt concentration of which solution is substantially equal to the weight percent cobalt concentration of the solution of heptenes and catalyst passed to said reaction zone, passing said solution to a separation zone, withdrawing liquid product from said zone, recycling a portion of said withdrawn product to said carbonylation reaction zone to provide cooling therefor, passing the portion of withdrawn product not recycled and wherein is dissolved carbonylation catalysts to a catalyst removal zone, maintaining said last named zone at a pressure substantially below that in said carbonylation zone, subjecting said product in said catalyst removal zone to a thermal treatment to remove dissolved cobalt carbonyl, withdrawing a solution comprising aldehyde product substantially free of dissolved cobalt compounds from said last named zone, passing said material to a hydrogenation zone, subjecting said material in said zone to a hydrogenation reaction, passing hydrogenated product to a distillation zone and recovering substantial yields of octyl alcohols.

2. The process of claim 1 wherein the pressure in said carbonylation zone is about 3000 p. s. i. g. and the temperature about 340°–360° F.

3. The process of claim 1 wherein the cobalt salt added to said heptene feed is a cobalt naphthenate.

4. The process of claim 1 wherein the concentration of said cobalt salt in said olefin feed is about 1.5–3.0% by weight in the total olefin content.

5. The process of claim 1 wherein the weight percent of cobalt dissolved in the liquid product withdrawn from said carbonylation reaction zone is no greater than the weight percent of cobalt dissolved in said olefin feed.

6. The process of claim 1 wherein the pressure in said catalyst removal zone is in the range of about 95 to 150 p. s. i. g. and the temperature is in the range of about 300° to 350° F.

7. The process of claim 1 wherein about 400 to 500 volume percent, based on olefin feed, of product withdrawn from said carbonylation zone is recycled thereto to provide cooling therefor.

PAUL T. PARKER.

References Cited in the file of this patent

UNITED STATES PATENTS

| Number | Name | Date |
| --- | --- | --- |
| 2,151,106 | Hentrich et al. | Mar. 21, 1939 |
| 2,437,600 | Gresham et al. | Mar. 9, 1948 |
| 2,464,916 | Adams et al. | Mar. 22, 1949 |
| 2,509,878 | Owen | May 30, 1950 |
| 2,557,701 | Smith | June 19, 1951 |

FOREIGN PATENTS

| Number | Country | Date |
| --- | --- | --- |
| 873,391 | France | Mar. 16, 1942 |

OTHER REFERENCES

U. S. Naval Technical Mission in Europe. Technical Report No. 248-45. The Synthesis of Hydrocarbons and Chemicals from CO and $H_2$. Page 122, September 1945.

Fiat Final Report No. 1000, PB-81383, December 26, 1947, pp. 8–12, 29 and 30. (Microfilm reel in Div. 31.)